United States Patent
Jiang et al.

(10) Patent No.: US 7,918,138 B2
(45) Date of Patent: Apr. 5, 2011

(54) WIRELESS MICROELECTROMECHANICAL SYSTEMS (MEMS) PRESSURE SENSOR WITH BUILT-IN CALIBRATION

(75) Inventors: Qing Jiang, Riverside, CA (US); Harold Glick, Corona, CA (US)

(73) Assignees: Regents of the University of California, Oakland, CA (US); The United States of America as represented by the Secretary of the Navy, Washington, DC (US)

( * ) Notice: Subject to any disclaimer, the term of this patent is extended or adjusted under 35 U.S.C. 154(b) by 61 days.

(21) Appl. No.: 12/369,444

(22) Filed: Feb. 11, 2009

(65) Prior Publication Data
US 2009/0266180 A1    Oct. 29, 2009

Related U.S. Application Data

(60) Provisional application No. 61/027,640, filed on Feb. 11, 2008.

(51) Int. Cl.
*G01L 9/00* (2006.01)
(52) U.S. Cl. .......................................................... 73/754

(58) Field of Classification Search .................... None
See application file for complete search history.

(56) References Cited

U.S. PATENT DOCUMENTS

| | | | | |
|---|---|---|---|---|
| 7,586,239 | B1* | 9/2009 | Li et al. | 310/323.02 |
| 2007/0000327 | A1* | 1/2007 | Sung et al. | 73/584 |
| 2010/0158071 | A1* | 6/2010 | Cobianu et al. | 374/142 |

OTHER PUBLICATIONS

Yeong Yau Loh, Fabrication Design of Micro Pressure Sensor With Built-in Automated Calibration, Master of Science Thesis, University of California—Riverside, Nov. 2006.
Jiang and Potter, Letter confirming Master's thesis was entered into the University catalog on Mar. 1, 2007.

* cited by examiner

*Primary Examiner* — Andre J Allen
(74) *Attorney, Agent, or Firm* — Cotman IP Law Group, PLC

(57) ABSTRACT

A wireless microelectromechanical system (MEMS) pressure sensor with built in calibration. An actuator is coupled with a pressure sensing device to enable the pressure to be calibrated against the known pressure exerted by the actuator. The sensing component is configured to flex under the application of force to a pure bending condition, i.e., the sensing component flexes with no or insignificant shear forces in the sensing component.

20 Claims, 14 Drawing Sheets

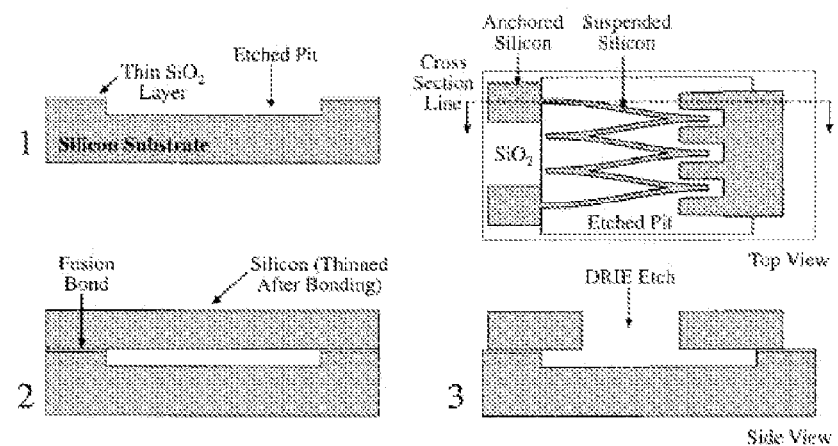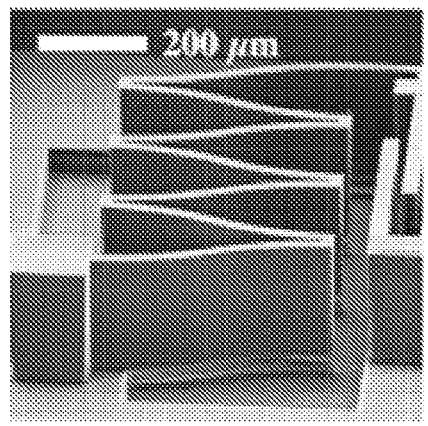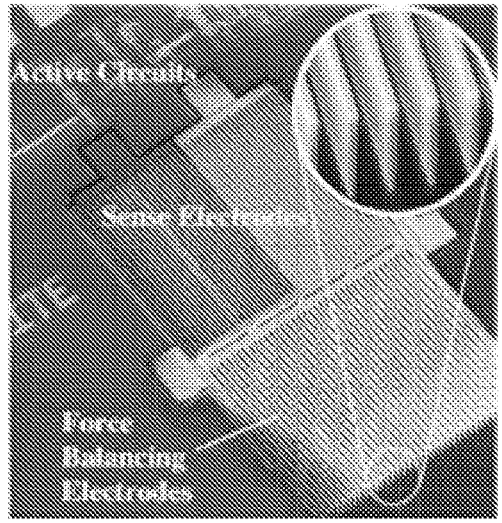
FIG. 13

WIRELESS MICROELECTROMECHANICAL SYSTEMS (MEMS) PRESSURE SENSOR WITH BUILT-IN CALIBRATION

This application claims the benefit of U.S. Provisional Patent Application Ser. No. 61/027,640 filed Feb. 11, 2008 the specification of which is hereby incorporated by reference.

STATEMENT OF GOVERNMENT INTEREST

This invention was made with United States Government support from the Department of the Navy under contract number N00244-01-D-0036. The United States Government has certain rights in the invention.

BACKGROUND OF THE INVENTION

1. Field of the Invention

The invention relates to the field of mechanical devices and is more particularly, but not by way of limitation, directed to a wireless microelectromechanical systems ("MEMS") Pressure Sensor with built-in calibration.

2. Description of the Related Art

MEMS micro pressure sensors are employed in a number of important applications. For example, MEMS pressure sensors may be used in automotive applications where they may monitor the pressure of fuel lines, exhaust gases, tires, and seats. These sensors may also be employed in implantable medical applications and may be used to measure ocular or cranial pressure.

These sensors may have to be periodically re-calibrated in order for the sensors to remain accurate. Traditionally, a sensor may be calibrated by applying a known pressure to the pressure sensor. The output of the pressure is measured and is compared with the value of the known pressure. This calibration information may then be used to correct subsequent readings. This traditional method may be labor intensive and costly, and may prevent MEMS pressure sensors from be employed in remote applications.

For at least the limitations described above there is a need for a wireless microelectromechanical system ("MEMS") pressure sensor with a built-in calibration.

BRIEF SUMMARY OF THE INVENTION

Pressure sensors are used in numerous applications to monitor and control the pressure of air, gas, fluid and vapor. To reliably measure absolute pressure, a pressure sensor must be calibrated. One or more embodiments of the invention are directed to a method and system for a modal integrated sensor/actuator designed such that the electrically driven actuators built within the system can be utilized as independent force sources for providing automated calibration of the pressure sensor. The system of one or more embodiments of the invention includes a wireless communication subsystem that may transmit both its measurement data and calibration data wirelessly to a remote system for further processing.

BRIEF DESCRIPTION OF THE DRAWINGS

The above and other aspects, features and advantages of the invention will be more apparent from the following more particular description thereof, presented in conjunction with the following drawings wherein:

FIG. 13 presents photographs of devices fabricated using a combination SFB-DRIE process.

DETAILED DESCRIPTION

The following descriptions of one or more embodiments of the invention are exemplary, rather than limiting, and many variations and modifications are within the scope and spirit of the invention. Although numerous specific details are set forth in order to provide a thorough understanding of one or more embodiments of the invention, it will be apparent to one of ordinary skill in the art, that embodiments of the invention may be practiced without these specific details. In other instances, well-known features have not been described in detail in order to avoid unnecessarily obscuring the present invention. Readers should note that although examples of the invention are set forth herein, the claims, and the full scope of any equivalents, are what define the metes and bounds of the invention.

One or more embodiments of the invention are directed to a wireless microelectromechanical system ("MEMS") Pressure Sensor with built-in calibration. One or more embodiments of the invention combine the sensing component and primary actuators in a single component.

Figure 1:
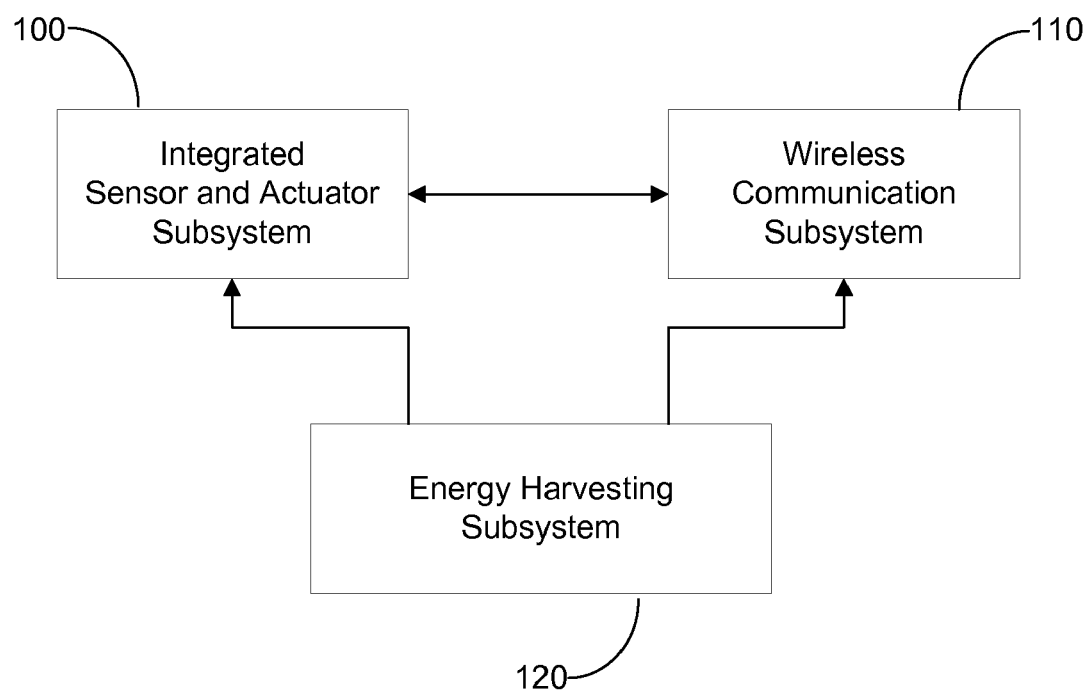
FIG. 1 is an illustrative schematic diagram of a wireless MEMS pressure sensor with built-in calibration (BIC) capability of one or more embodiments of the invention.

FIG. 1 illustrates a schematic diagram of a wireless MEMS pressure sensor with built-in calibration capability. The wireless BIC (Build-In-Calibration) pressure sensor of one or more embodiments of the invention may contain at least three primary components: integrated sensor/actuator subsystem 100, wireless communication subsystem 110 and energy-harvesting subsystem 120. While the pressure sensor of the one or more embodiments of the invention may be utilized in a marine application, one of ordinary skill in the art will recognize that the invention may be applied to any application where there is a need to measure the pressure of air, vapor or any gas, and where wireless self-calibration is desired or required. The device described herein may be configured as schematically illustrated in FIG. 1. Various forms of wireless communication subsystems and energy-harvesting subsystems as referred to here may be familiar to those of skill in the art of pressure sensor design, and so are not discussed in further detail here.

Figure 2:
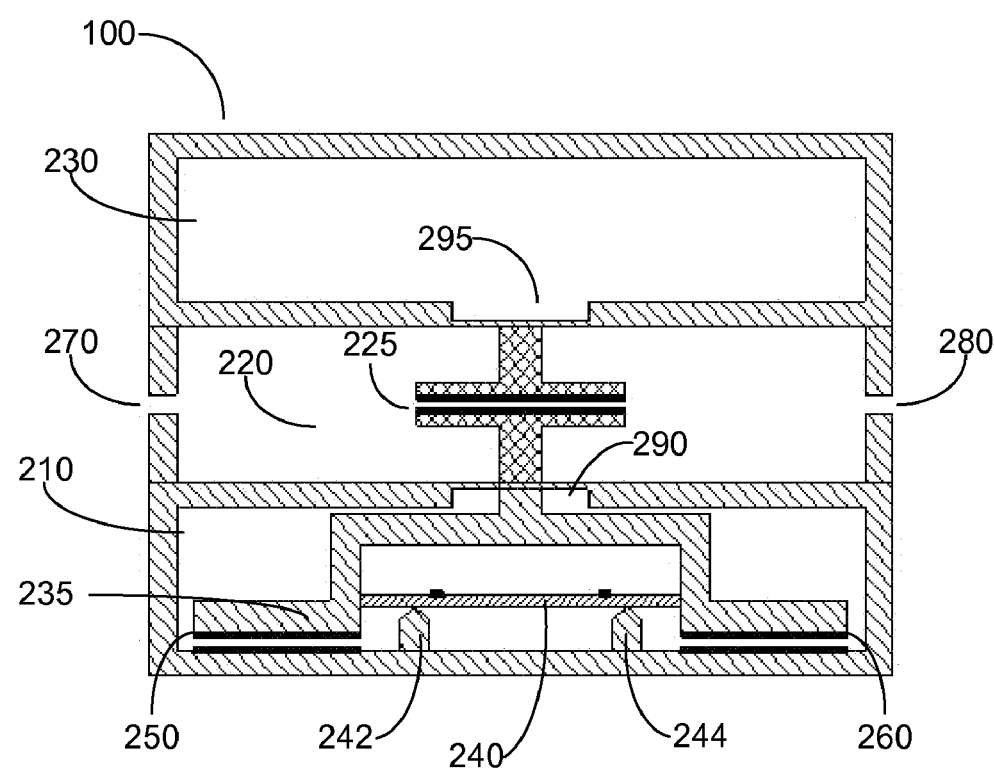
FIG. 2 is a schematic illustration of an exemplary embodiment of the mechanical structure of the integrated sensor/actuator subsystem of one or more embodiments of the invention.

Integrated sensor/actuator subsystem 100 may have a plurality of chambers. FIG. 2 illustrates one or more embodiments of the invention showing an exemplary design of the mechanical structure of an integrated sensor/actuator subsystem, where three chambers are utilized. In a three chamber subsystem, the upper chamber 230 may be a "dummy chamber" whose sole purpose it to provide a respite from external pressures for diaphragms 290 and 295, or it can be similar or identical to the lower chamber 210. However, other configurations of the subsystem, including mechanical structures with only two chambers, or with more than three chambers, could be implemented in the spirit of the invention. Configurations with alternative numbers of chambers might have more or less diaphragms such as diaphragm 290, to reflect the configuration and purpose of the alternative number of chambers.

In one exemplary embodiment, integrated sensor/actuator subsystem 100 is illustrated with three chambers, as shown in FIG. 2. Lower chamber 210, center chamber 220 and the upper chamber 230 make up integrated sensor/actuator subsystem 100. It may be noted that upper chamber 230 may be, as here, called a "dummy structure." Despite being referred to as a "dummy structure," when present upper chamber 230 serves the purpose of separating diaphragm 295, which is coupled to secondary actuator 225, from the external portion of the component and is designed to minimize the offset. One of ordinary skill in the art of pressure sensor design will be aware that integrated sensor/actuator subsystem 100 could be designed with a different number of sensor arrays than the two illustrated in FIG. 2, but FIG. 2 demonstrates at least one embodiment of the invention.

As illustrated in FIG. 2, center chamber 220 may be filled with a pressurized medium for which the sensor is to determine the pressure. The pressure of the medium acting on diaphragm 290 is transferred to the mechanical structure in lower chamber 210, in which sensor arrays (primary actuator) 250 and 260 reside. It should be noted that a secondary actuator 225 may be included in a center or other chamber of center chamber 220 to counter balance the constant pressure in center chamber 220 during calibration in one or more embodiments of the invention.

In one or more embodiments of the invention, frame 235 supports sensing component 240. As the pressure of the gas acts upon diaphragm 290, diaphragm 290 flexes and exerts a force onto frame 235 and urges frame 235 against the lowermost surface of lower chamber 210. As frame 235 moves towards the lowermost surface of lower chamber 210, sensing component 240 may be pressed against input inter-digital transducer 242 and output inter-digital transducer 244. Input inter-digital transducer 242 and output inter-digital transducer 244 may act as fulcrums or pivot points. As the outer most portions of sensing component 240 is pressed toward the lowermost surface of lower chamber 210, the innermost portion of sensing component 240 flexes away from the lowermost surface of lower chamber 210. In one or more embodiments of the invention, the sensing component will forced to form a pure-bending condition. In one or more embodiments of the invention, the frame may be pressed against a vertical surface, an upper surface, or a surface with any orientation for example.

In one or more embodiments of the invention, the sensing component 240 may act as a deformable beam in a pure bend condition with no or insignificant shear forces between the input inter-digital transducer 242 and output inter-digital transducer 244.

In one or more embodiments of the invention, frame, sensing component may be fabricated out of a semiconducting material, such as silicon or germanium, for example. In one or more embodiments of the invention, the sensing component 240 may have a length in the range of approximately 150 micrometers to approximately 250 micrometers. In one or more embodiments of the invention, sensing component may have a width in the range of approximately 50 micrometers to approximately 70 micrometers. In one or more embodiments of the invention, sensing component 240 may have a thickness in the range of approximately 3 micrometers to approximately 8 micrometers. In one or more embodiments of the invention, the input inter-digital transducer 242 is placed in the range of approximately 30 micrometers to approximately 65 micrometers from one end of sensing component 240. In one or more embodiments of the invention, the output inter-digital transducer may be placed in the range of approximately 30 micrometers to approximately 65 micrometers from the other end of sensing component 240. In one or more embodiments of the invention, sensing component may have other dimensions such that sensing component 240 flexes in a pure-bend condition with no or insignificant shear forces.

The system of one or more embodiments of the invention may have at least two operational modes. The first mode is a "sensing mode" and the second mode is a "calibration mode." One of ordinary skill in the art may envision additional modes for a system of the type embodying one or more aspects of the invention, including modes responsive to integration of the system of one or more embodiments of the invention into other systems and devices and those modes are within the scope of one or more embodiments of the invention, but for the purposes of clearly illustrating one or more embodiments of the invention, only the sensing mode and calibration modes will be described herein. Other modes however are considered within the scope and spirit of the invention.

Figure 3:
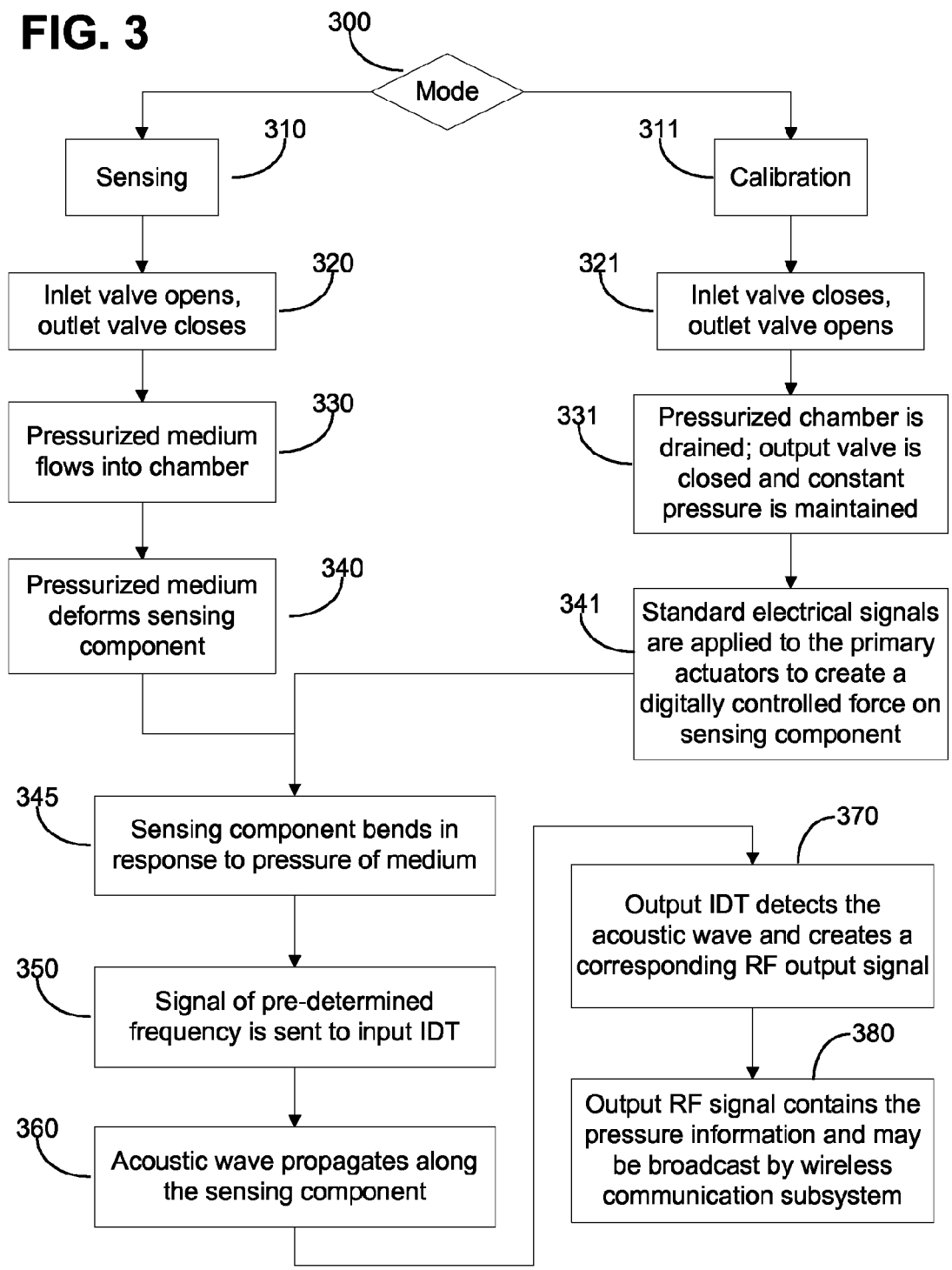
FIG. 3 is a flow diagram illustrating exemplary operating modes of one or more embodiments of the invention.

FIG. 3 illustrates a method of operation in sensing mode. At step 300, a control determines if the system enters sensing mode 310, or calibration mode 311. If sensing mode 310 is chosen, control moves to step 320, where inlet valve 270 is opened while outlet valve 280 is closed, so that the pressurized medium (air, vapor or other gas) may flow into center chamber 220 at step 330. At step 340, the pressure of the gas acting on diaphragm 290 is transferred to sensing component 240 in lower chamber 210, forcing sensing component 240 into the pure-bending condition, i.e., there are no shear forces between input inter-digital transducer (IDT) 242 and output inter-digital transducer 244 (represented by the two black bars on sensing component 240).

Thus, at step 345, sensing component 240 bends in response to the pressure of the medium. At step 350, a signal is sent with a pre-determined frequency to input inter-digital transducer 242, which leads to an acoustic wave propagating along sensing component 240 at step 360. The acoustic wave is detected by output inter-digital transducer 244 at step 370. The signal from output inter-digital transducer 244 carries the pressure information at step 380. The primary actuators 250 and 260 may be an electrostatic actuator, an electromechanical actuator, a thermal actuator, or an electromagnetic actuator.

At step 300, if calibration mode is selected (311), control moves to step 321 where inlet value 270 is closed to cut off the pressurized media source, and outlet valve 280 is then opened to drain the pressurized medium out of the center chamber. Next, the chamber is drained at step 331 after outlet valve 280 is closed so that the pressure in center chamber 220 is kept constant during calibration. Subsequently, at step 341, with electrical signals traceable to external standards, the primary electrically-driven actuators of the primary actuators 250 and 260 are activated to generate a digitally-controlled force, which may force sensing component 240 into the pure-bending condition of step 345, in the same way the pressure of a gas to be measured may do so when following the method of sensing mode 310. Steps 350 to 380 are completed in a similar fashion for calibration mode 311 as they were for sensing mode 310, and the RF output signal contains the information on the pressure measurement for a known pressure, thus creating calibration data. Thus, the calibration mode creates an IDT output just as does sensing mode 310, but does so for a known pressure.

The pre-established correlation between the force-induced phase shift of calibration mode 311 and the pressure-induced phase shift of sensing mode 310 in a given RF signal may then be used by a remote system to compute calibration data for the integrated sensor. Calibration data may then be correlated to all measurements from a given embodiment of the invention to determine precise absolute pressure as detected by the system. The method of correlating the calibration information to the sensing data may be computed using the method described below.

In one or more embodiments of the invention, the mechanical structure of integrated sensor/actuator subsystem 100 is designed so that sensing component 240 may be subjected to the so-called "pure bending condition" in operation, the relative change $\Delta\omega/\omega$ of the wave frequency (equivalent to the phase shift) due to the presence of the pressure can be presented by the following so-called Tiersten's integral:

$$\frac{\Delta\omega}{\omega} \cong \frac{1}{2\omega^2} \frac{\int_V \hat{c}_{LyMa} u_{y,L} u_{\alpha,M}\, dV}{\int_V \rho_0 u_\alpha u_\alpha\, dV}, \quad (1)$$

where the second-order elastic constants are given by $$\hat{c}_{K\alpha L\gamma} = T_{KL}^0 \delta_{\alpha\gamma} + c_{K\alpha LN} w_{\gamma,N} + c_{KML\gamma} w_{\alpha,M} + c_{K\alpha L\gamma AB} E_{AB}^0,$$

$$T_{KL}^0 = c_{IJKL} E_{KL}^0,$$

$$E_{KL}^0 = (w_{K,L} + w_{L,K})/2. \quad (2)$$

In the above equation, $w_\alpha$ denotes the displacements induced by the pressure, $E^0_{AB}$ denotes the strains induced by the pressure, and $T^0_{KL}$ denotes the stresses induced by the pressure. With this integral presentation, the correlation between the force-induced phase shift of step 311 and the pressure-induced phase shift of sensing step 310 in a given RF signal can be developed.

Figure 4:
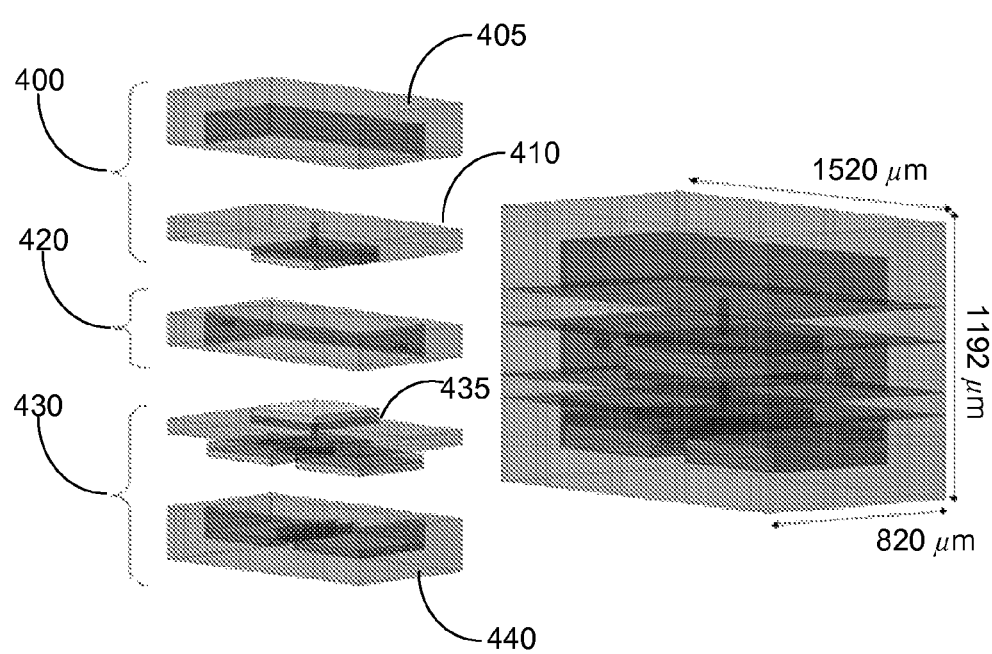
FIG. 4 illustrates decomposition of an exemplary integrated sensor/actuator subsystem of one or more embodiments of invention into three major sub-structures.

Integrated sensor/actuator subsystem 100 may be decomposed into two or more major sub-structures for fabrication with commercially available MEMS technology. FIG. 4 illustrates the decomposition of integrated sensor/actuator subsystem 100 into three major sub-structures for illustration. Here, upper structure 400 corresponds to upper chamber 230 of the schematic illustration of FIG. 2, and may have an upper case 405 and upper cover 410. Diaphragm 295 and secondary actuator 225 may be located in upper cover 410.

FIG. 4 also illustrates a decomposition of middle structure 420, which corresponds to schematic center chamber 220, and may be the chamber where the pressurized medium is collected. Inlet hole and inlet valve 270 and outlet hole and outlet valve 280 are part of middle structure 420, and may be used to allow external pressure to enter and leave middle structure 420. The case thickness of the structure may be determined to minimize deflection or damage under maximum pressure, $Pe_{max}$. Secondary actuator 225 for automated calibration may also be located inside middle structure 420.

FIG. 4 further illustrates a decomposition of lower structure 430 into lower cover 435 and the lower case 440. The primary functions of one or more embodiments of the invention may be performed in the lower structure 430. FIG. 4 further provides illustration of sizing information for integrated sensor/actuator subsystem 100.

Figure 5:
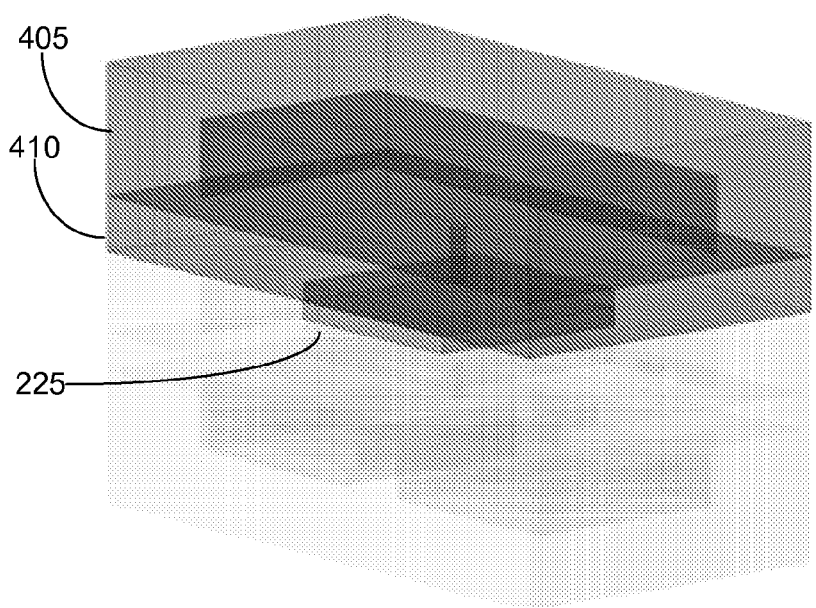
FIG. 5 illustrates a more detailed decomposition of the upper structure and actuator of an exemplary integrated sensor/actuator subsystem of one or more embodiments of the invention.

FIG. 5 illustrates a more detailed decomposition of upper structure 400 and actuator of an exemplary integrated sensor/actuator subsystem of one or more embodiments of the invention. Upper case 405 and upper cover 410 may encompass actuator 225, whose function may be as described above.

Figure 6:
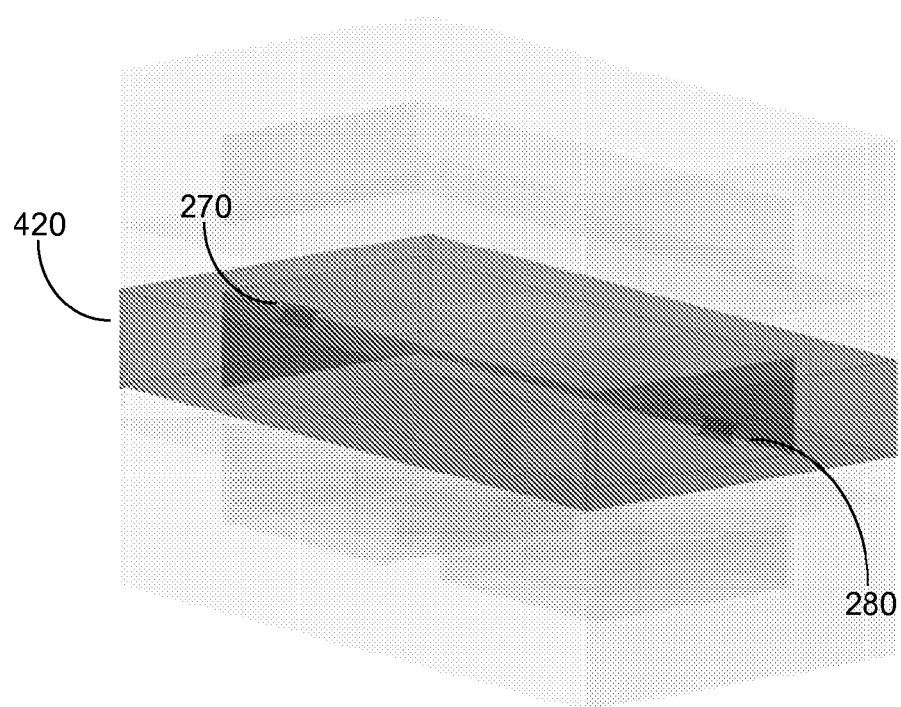
FIG. 6 illustrates a more detailed decomposition of the middle structure of an exemplary integrated sensor/actuator subsystem of one or more embodiments of the invention, showing an exemplary location of inlet hole and valve 270 and outlet hole and valve 280.

FIG. 6 illustrates a more detailed decomposition of middle structure 420 of an exemplary integrated sensor/actuator subsystem of one or more embodiments of the invention, showing exemplary locations of inlet hole and inlet valve 270 and outlet hole and outlet valve 280. Other locations are also plausible in keeping with the scope and spirit of the invention.

Figure 7:
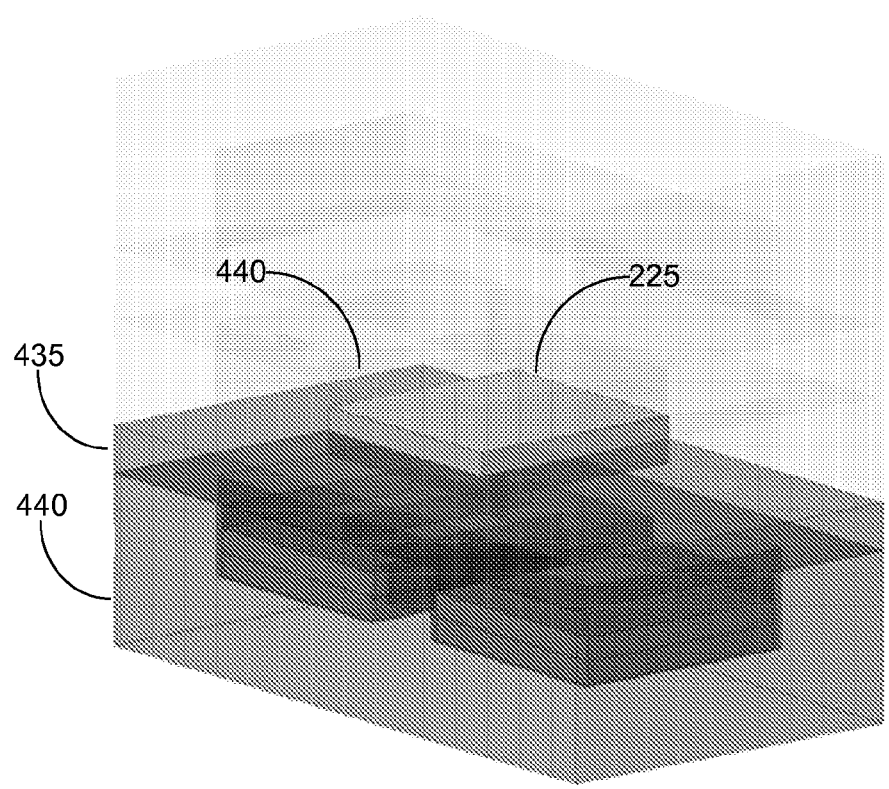
FIG. 7 illustrates a more detailed decomposition of the lower structure of an exemplary integrated sensor/actuator subsystem of one or more embodiments of the invention for illustration, showing a lower cover and lower case for the subsystem.
Figure 8:
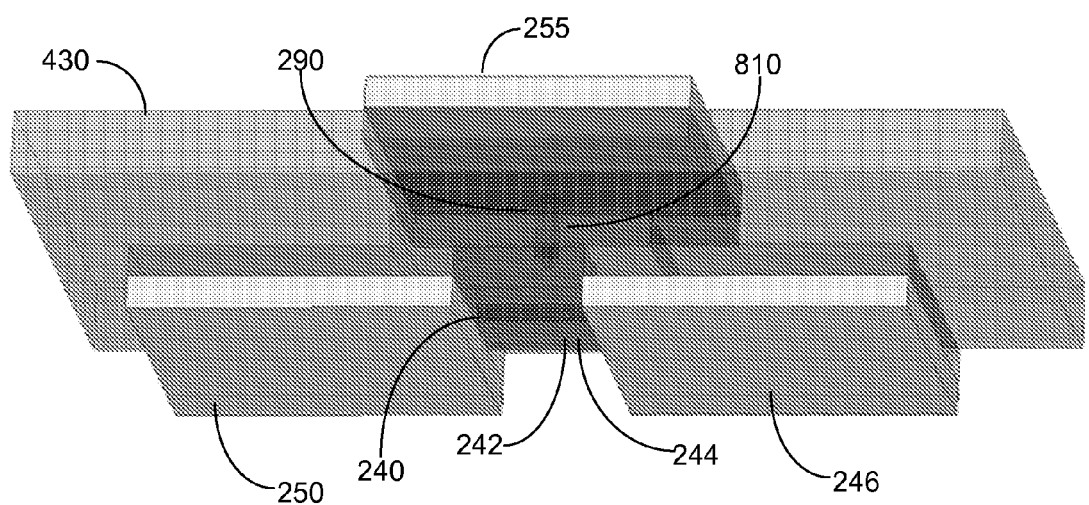
FIG. 8 illustrates a more detailed schematic/decomposition of the lower structure of an exemplary integrated sensor/actuator subsystem of one or more embodiments of the invention for illustration.
Figure 9:
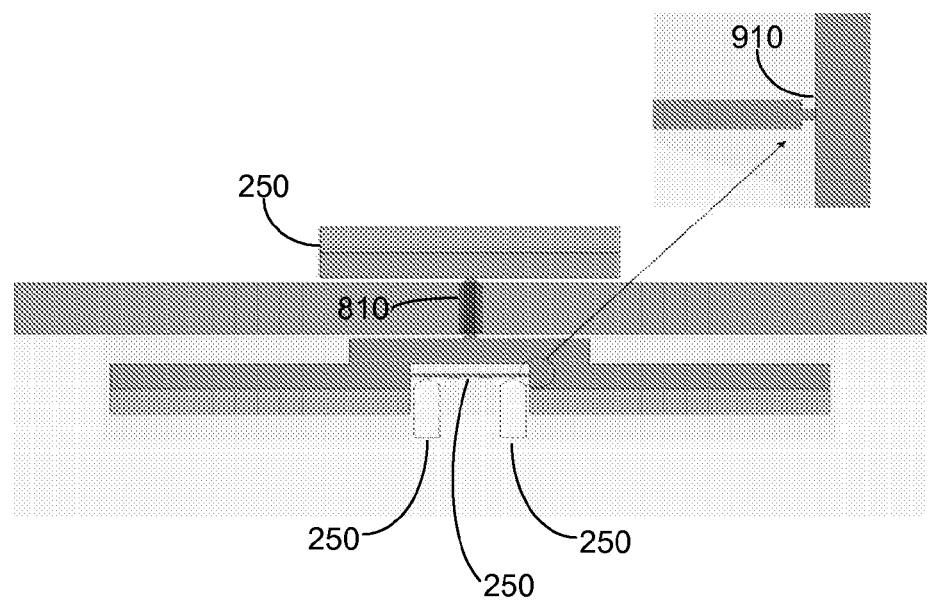
FIG. 9 illustrates a front view of more detailed schematic/decomposition of the lower structure of an exemplary integrated sensor/actuator subsystem of one or more embodiments of the invention for illustration, showing a cut extrudes at an end of a sensing bar.

FIGS. 7, 8 and 9 further illustrates lower structure 430 of an exemplary integrated sensor/actuator subsystem of one or more embodiments of the invention, showing lower cover 435 and lower case 440. FIG. 7 also illustrates one exemplary location for actuator 225 in relation to lower structure 430. Primary actuators 250 and 260 may be located in lower cover 435 and lower case 440 with a tiny gap. The support structures are placed on lower case 440 to allow a deflection of sensing component (bar) 240. A more detailed illustration of lower structure 430 is given in FIGS. 8 and 9.

FIG. 8 illustrates a more detailed schematic/decomposition of lower structure 430 of an exemplary integrated sensor/actuator subsystem of one or more embodiments of the invention showing a more detailed decomposition of lower structure 430. FIG. 8 provides a suggested location for load transfer cylinder 810, between secondary actuator 225, diaphragm 290 and sensing component 240 in one or more embodiments of the invention. FIG. 8 also illustrates possible locations of primary actuators 250 and 260 in relation to sensing component 240 and secondary actuator 225 in one or more embodiments of the invention.

FIG. 9 illustrates a front view of more detailed schematic/decomposition of lower structure 430 of an exemplary integrated sensor/actuator subsystem of one or more embodiments of the invention showing secondary actuator 225, load transfer cylinder 810, inter-digital transducers 242 and 244, and sensing component 240. An insert in FIG. 9 illustrates cut extrudes which may be made at the ends of the sensing component 240 to narrowed at its attachment to lower structure 430 to enhance the sensitivity of sensing component 240 as shown at 910.

In one or more embodiments of the invention, a MEMS pressure sensor may be fabricated through wet bulk micromachining, chemical vapor deposition, silicon fusion bonding, deep reactive ion etching, laser micromachining, and or surface activated bonding.

In one or more embodiments of the invention, wet bulk micromachining may be employed to remove selected material and to reveal crystallographic planes. Wet bulk machining may employ liquid solutions to etch features into the material or the substrate. Etching solutions may be isotropic or anisotropic. Isotropic etches may remove material in all directions at the same rate, regardless of the crystallographic orientation of the material. Anisotropic etching removes material in some directions at a much greater rate than in other directions, which may create microscopic features having a high aspect ratio for example. Anisotropic etching of a material may form smooth and inclined surfaces, and may form structures with sharp corners. Anisotropic etching may form the shape and structures required by one or more embodiments of the invention.

In one or more embodiments of the invention, Potassium Hydroxide ("KOH"), Ethylenediamine pyrocatechol ("EDP") and Tetra-methyl Ammonium Hydroxide ("TMAH") may be employed as an anisotropic etchant for silicon. Each of these compounds may be diluted in water. The relative concentration and temperatures of the solutions may affect the etch rate and etching characteristics.

Figure 10:
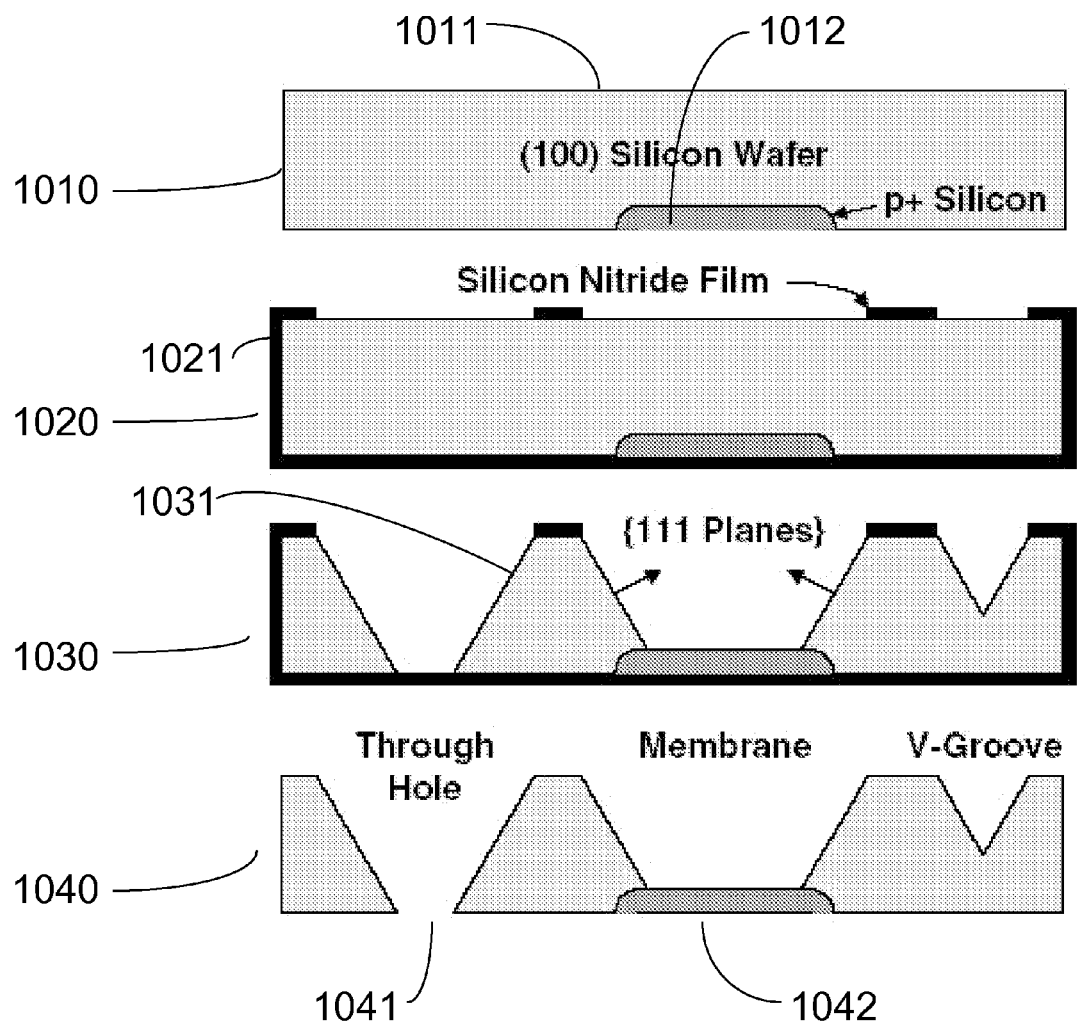
FIG. 10 illustrates the effects of anisotropic etching in one or more embodiments of the invention.

FIG. 10 illustrates the effects of anisotropic etching in one or more embodiments of the invention. The wafer at step 1010 illustrates a (100) silicon wafer 1011 with a p+ region 1012 on the bottom of the silicon wafer 1011. The wafer at step 1020 illustrates a silicon wafer 1011 having a silicon nitride masking layer 1021 covering the areas of the silicon wafer 1011 shown as a thick black line. In one or more embodiments of the invention, an oxide or a nitride mask may be employed. The wafer at step 1030 illustrates the results of the silicon wafer 1011 having undergone an anisotropic etching which reveals the <111> planes 1031 for example. The wafer at step 1040 illustrates the removal of the silicon nitride masking layer 1021 which may reveal a hole 1041 or a membrane 1042 for example.

In one or more embodiments of the invention, silicon dioxide may be employed as a masking layer and EDP may be used as an anisotropic etchant. In one or more embodiments of the invention, EDP may produce z-incline planes of 45° for planes inclined 45° in the (100) plane, whereas KOH and TMAH may produce z-incline planes of 90° and 30° respectively. The etch rate may be approximately 1.25 µm/min for a process done with EDP/water concentrations of 750 mL/120 g/240 mL at 115° C.

Figure 11:
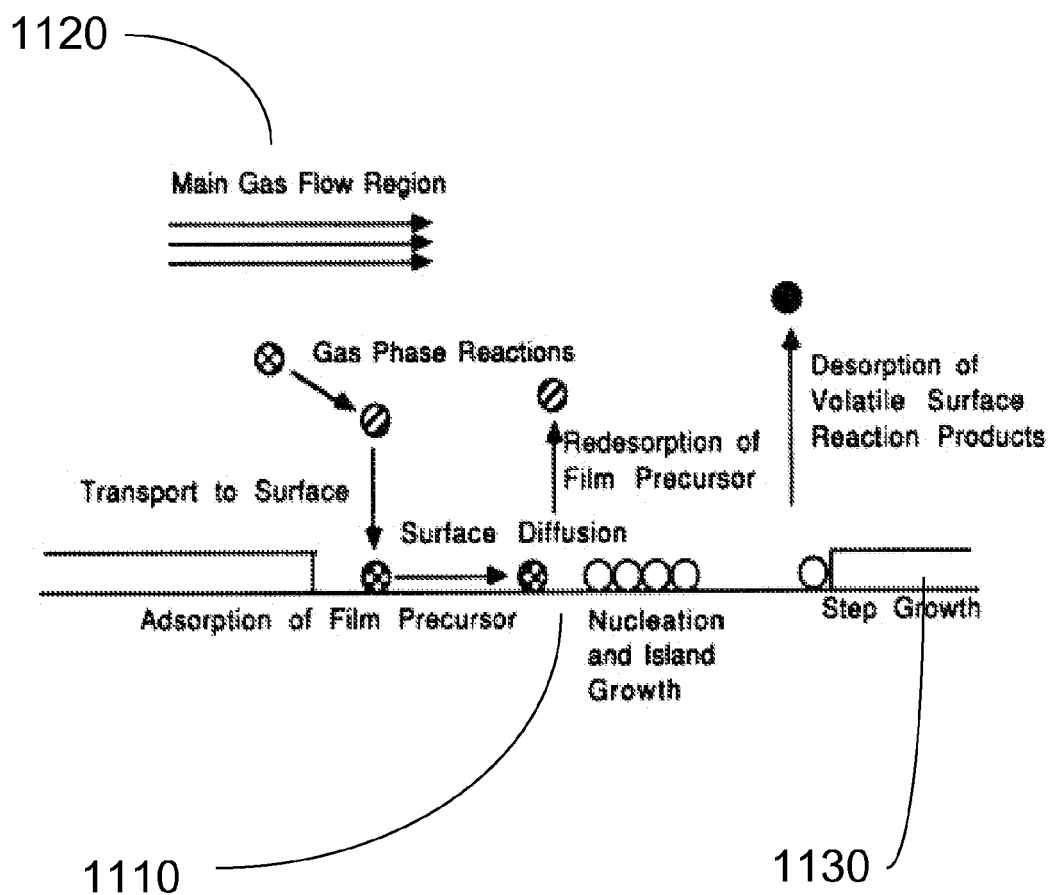
FIG. 11 illustrates the exemplary chemical reactions that may occur during a growth of a layer using a CVD process.

In one or more embodiments of the invention, a Chemical Vapor Deposition ("CVD") process may be employed to deposit thin films of material to form the MEMS devices. FIG. 11 illustrates the exemplary chemical reactions that may occur during a growth of a layer using a CVD process. Substrate 1110 is placed inside a CVD reactor chamber and may be heated. Source gases 1120 which may contain the reactants are introduced into the CVD reactor chamber. The source gases 1120 may undergo a chemical reaction to form a film 1130 on the substrate 1110.

In one or more embodiments of the invention, a Plasma Enhanced CVD (PECVD), an Atmospheric Pressure CVD (APCVD) and a Low-Pressure CVD (LPCVD) may be employed. PECVD may grow materials that may have the best step coverage. PECVD may also be used for depositing oxides. Materials grown by an APCVD process may suffer from poor step coverage. The LPCVD process may grow materials with low deposition rates and high processing temperatures.

In one or more embodiments of the invention, a PECVD process may be used to deposit silicon dioxide in surface and bulk micromachining processes. In one or more embodiments of the invention, gaseous mixture of 5% silane, nitrous oxide, helium mixture at ~800 mTorr may produce films with low pinholes.

In one or more embodiments of the invention, a silicon fusion bonding ("SFB") process may bond silicon surfaces together to form MEMS devices for example. As the process may be sensitive to particles in the surfaces, a thorough planarization and cleaning process may be performed before bonding. This process may be employed to bond silicon to silicon, silicon to silicon dioxide and silicon to silicon nitride for example. This process may be used to produce Silicon On Insulators ("SOI") wafers.

Figure 12:
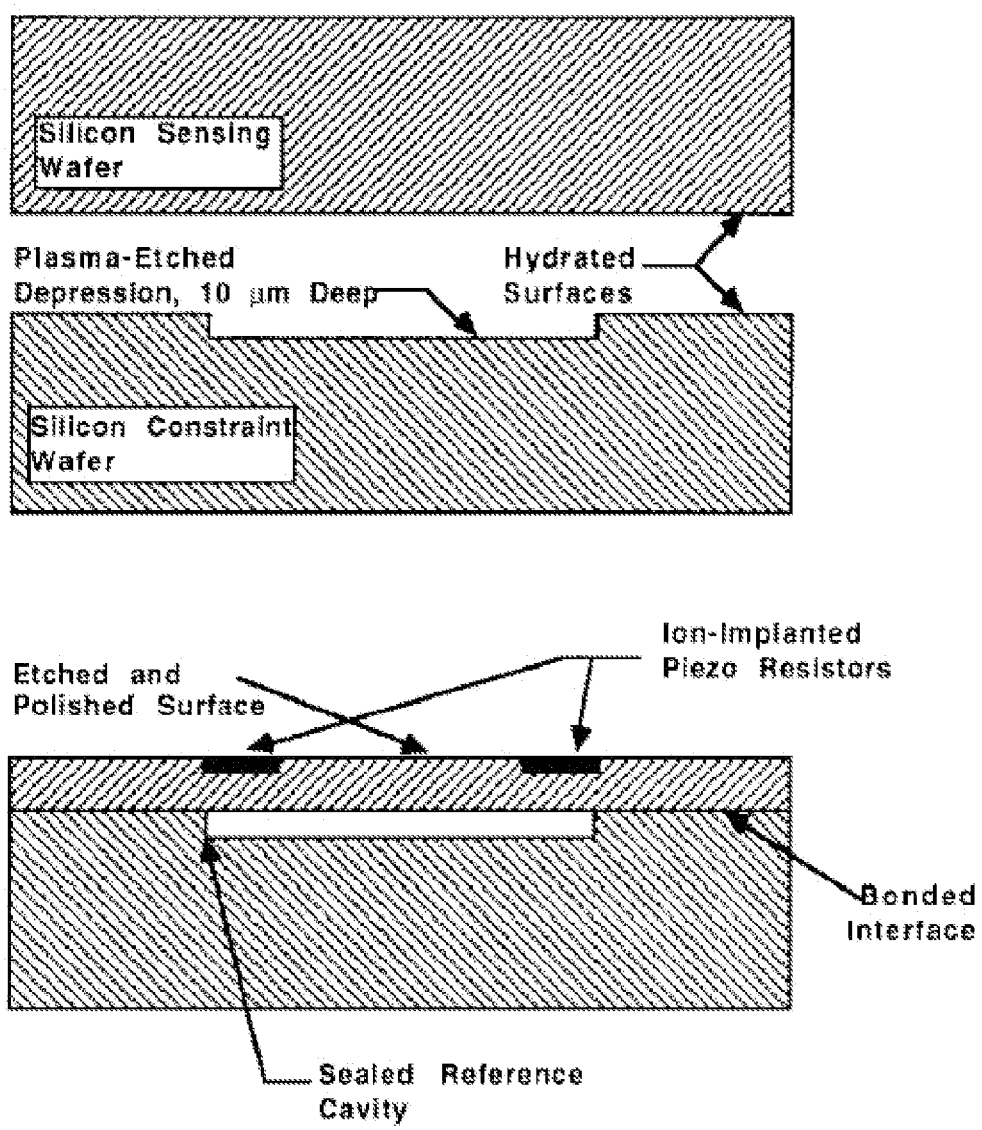
FIG. 12 presents an exemplary illustration of the results of this process in one or more embodiments of the invention.

After the surfaces have been cleaned and hydrated, the surfaces may be brought into contact. A pressure applied at one point may initiate a pressure wave. Initially, the molecular bonds are weak van der Waals bonds at room temperature but strong covalent bonds may be formed after a high temperature anneal. The wafers may then undergo a high temperature anneal in range of temperatures of approximately 800° C. to approximately 1200° C. The MEMS exchange has process modules that are usually at 1150° C. FIG. 12 presents an exemplary illustration of the results of this process in one or more embodiments of the invention.

In one or more embodiments of the invention, a Deep Reactive Ion Etching ("DRIE"), also known as the Bosch process, may be employed to fabricate MEMS devices with high aspect ratio features. The Bosch process employs alternating passivation of a polymer and etching steps. The repetitive alternation may result in a highly directional down etch with good sidewall planarity. High aspect ratios (20:1) and good feature resolutions (<1 µm) coupled with high photoresist and oxide selectivities may be achieved. FIG. 13 presents photographs of devices fabricated using a combination SFB-DRIE process.

In one or more embodiments of the invention, laser micromachining may be employed to achieve channel widths of as low as 10 µm and depth of entire wafers have been drilled to form a hole. Characterization of various holes of depths up to 625 µm performed with laser percussion drilling may be achieved.

In one or more embodiments of the invention, surface activated bonding may be employed. Surface Activated Bonding ("SAB") is a direct bonding method that uses a special surface preparation process in order to change and control the bonding mechanism. Due to the surface preparation process, also called surface activation, higher energy bonds such as covalent bonds may be formed across the bond interface at room temperature. Hence, annealing temperatures required may be usually much lower than direct silicon fusion bonding.

Figure 14A:
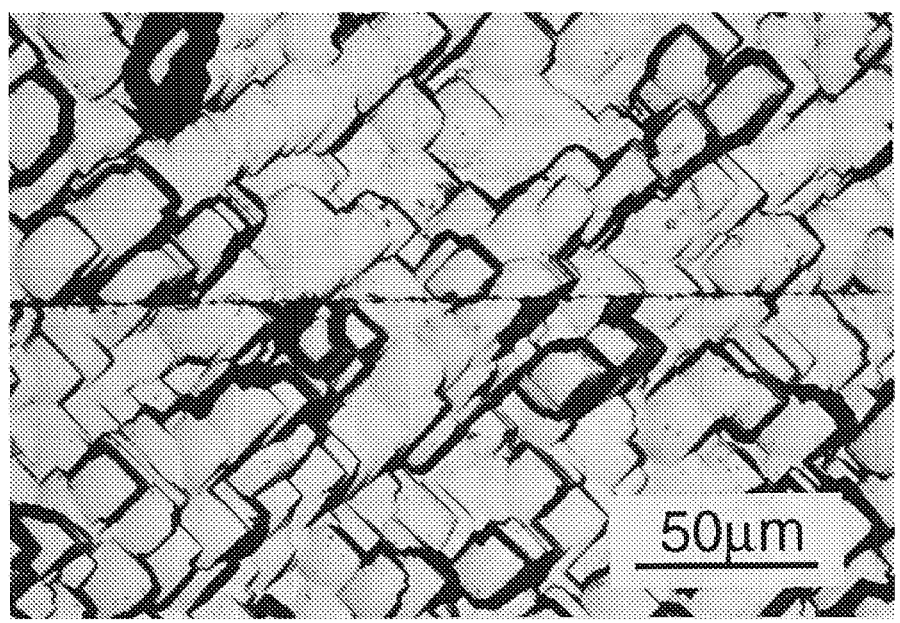
FIG. 14A presents Scanning Electron Microscope ("SEM") cross-sections of the bond interface.
Figure 14B:
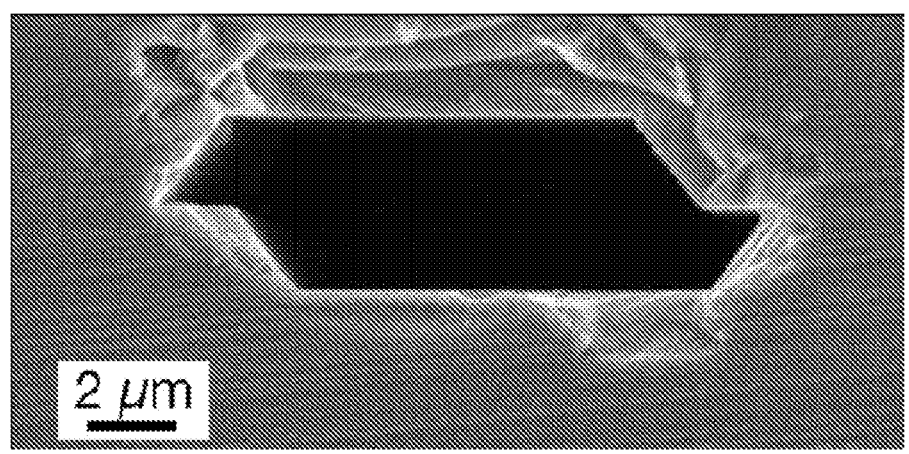
FIG. 14B presents Scanning Electron Microscope ("SEM") cross-sections of the bond interface.

A surface activated process may utilize dry activation using argon beam sputtering. Direct bonding of silicon surfaces with high bond strength that was equivalent to bulk silicon may be observed. Alignment accuracy within 2 µm may be achieved with minimal interfacial void formation. FIGS. 14A and 14B present Scanning Electron Microscope ("SEM") cross-sections of the bond interface.

It is believed that the forgoing describes a wireless microelectromechanical systems pressure sensor with built-in calibration, and it will be apparent that various changes may be made in the form, construction and arrangement of the parts without departing from the spirit or scope of the invention or sacrificing all of the material advantages, the forms herein above described being merely preferred or exemplary embodiments thereof.

While the invention herein disclosed has been described by means of specific embodiments and applications thereof, numerous modifications and variations could be made thereto by those skilled in the art without departing from the scope of the invention set forth in the claims.

What is claimed is:

1. A microelectromechanical systems pressure sensor apparatus comprising:
    a chamber, said chamber comprising a diaphragm on a surface of said chamber;
    a frame, said frame contained within said chamber, said frame coupled with said diaphragm;
    an input inter-digital transducer, said input inter-digital transducer coupled with another surface of said chamber;
    an output inter-digital transducer, said output inter-digital transducer coupled with said another surface of said chamber;
    a sensing component, said sensing component coupled with said frame, said sensing component coupled with said input inter-digital transducer, said sensing component coupled with said output inter-digital transducer; and
    an actuator, said actuator configured to urge said frame against said another surface of said chamber.

2. The apparatus of claim 1 wherein said sensing component is configured to flex without the presence of shear forces between said input inter-digital transducer and said output inter-digital transducer.

3. The apparatus of claim 1 wherein said sensing component comprises silicon.

4. The apparatus of claim 1 wherein said sensing component has a thickness in the range of approximately 3 micrometers to approximately 8 micrometers.

5. The apparatus of claim 1 wherein said sensing component has a length in the range of approximately 150 micrometers to approximately 250 micrometers.

6. The apparatus of claim 1 wherein said sensing component has a width in the range of approximately 50 micrometers to approximately 70 micrometers.

7. The apparatus of claim 1 wherein said input inter-digital transducer contacts said sensing component in the range of approximately 30 micrometers to approximately 65 micrometers from a first end of said sensing component.

8. The apparatus of claim 1 wherein said input inter-digital transducer contacts said sensing component in the range of approximately 30 micrometers to approximately 65 micrometers from a second end of said sensing component.

9. The apparatus of claim 1 wherein said actuator comprises an electrostatic actuator.

10. The apparatus of claim 1 wherein said actuator comprises an electromechanical actuator.

11. The apparatus of claim 1, further comprising an energy harvesting subsystem and a wireless communication system.

12. A microelectromechanical systems pressure sensor apparatus comprising:
    an upper chamber;
    a center chamber, said center chamber coupled with said upper chamber; said center chamber comprising an inlet valve and an outlet valve;
    a lower chamber, said lower chamber coupled with said center chamber;
    a first diaphragm separating said upper chamber and said center chamber;
    a second diaphragm separating said lower chamber and said center chamber;
    a secondary actuator within said center chamber, wherein a top surface of said secondary actuator is coupled to said first diaphragm and a bottom surface of said secondary actuator is coupled to said second diaphragm;
    a frame, said frame contained within said lower chamber, said frame coupled with said second diaphragm;
    an input inter-digital transducer, said input inter-digital transducer coupled with another surface of said lower chamber;
    an output inter-digital transducer, said output inter-digital transducer coupled with said another surface of said lower chamber;
    a sensing component, said sensing component coupled with said frame, said sensing component coupled with said input inter-digital transducer, said sensing component coupled with said output inter-digital transducer; and
    an actuator, said actuator configured to urge said frame against said another surface of said lower chamber.

13. The apparatus of claim 12 wherein said sensing component comprises silicon.

14. The apparatus if claim 12 wherein said sensing component has a thickness in the range of approximately 3 micrometers to approximately 8 micrometers.

15. The apparatus of claim 12 wherein said sensing component has a length in the range of approximately 150 micrometers to approximately 250 micrometers.

16. The apparatus of claim 12 wherein said sensing component has a width in the range of approximately 50 micrometers to approximately 70 micrometers.

17. The apparatus of claim 12 wherein said input inter-digital transducer contacts said sensing component in the range of approximately 30 micrometers to approximately 65 micrometers from a first end of said sensing component.

18. The apparatus of claim 12 wherein said input inter-digital transducer contacts said sensing component in the range of approximately 30 micrometers to approximately 65 micrometers from a second end of said sensing component.

19. The apparatus of claim 12 wherein said actuator comprises an electrostatic actuator.

20. The apparatus of claim 12, further comprising an energy harvesting subsystem and a wireless communication system.

* * * * *